Patented Mar. 31, 1942

2,278,090

UNITED STATES PATENT OFFICE 2,278,090

METHOD OF THIODIGLYCOL PRODUCTION

Donald F. Othmer, Coudersport, Pa., and
Donald Q. Kern, Brooklyn, N. Y.

No Drawing. Application February 3, 1940,
Serial No. 317,120

22 Claims. (Cl. 260—609)

This invention relates to a process for the manufacture of organic compounds similar to and including thiodiglycol.

Thiodiglycol has been prepared heretofore by the method of Victor Meyer; Berichte 19, 3259 (1886). It has been used chiefly as an intermediate product in the manufacture of dichlorodiethyl sulfide, which material, under the name of mustard gas, is formed by chlorination with anhydrous hydrochloric acid. The principal cost of the final product, mustard gas, is the cost of production of the thiodiglycol and the latter's high cost has prevented other useful potentialities of thiodiglycol from being investigated.

Thiodiglycol has a great advantage as having a carbon-sulfur-carbon linkage which means that it may be an important starting point for various other compounds related to the chemistry of the glycols. In addition, the properties of thiodiglycol itself indicate that it may be useful in a large number of ways by itself, in the various arts, and sciences.

One object of this invention is to provide thiodiglycol by a simple and inexpensive method and from readily available materials. Another object is the production of thiodiglycol in simple equipment, in a single chemical reaction, and at a rate much faster than hitherto realized. Still another object is the condensation of ethylene oxide and hydrogen sulfide to give thiodiglycol in much smaller equipment than hitherto possible. A further object is the production of pure thiodiglycol from ethylene oxide and hydrogen sulfide using the product as the solvent and in equipment where the physical operation of gas absorption is done separately in a unit designed for the purpose; and the chemical condensation itself is accomplished in equipment designed for that separate purpose. Still other objects and means for their realization are hereinafter described.

In addition to the method of manufacture of compounds similar to and including thiodiglycol by the Victor Meyer method, there has been indicated in French Patent No. 769,216 a method by Chichibabin which is based on the reaction in the gaseous phase of hydrogen sulfide and ethylene oxide according to the following reaction:

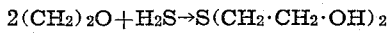

This chemical reaction has also been carried out by Nenitzescu and Scarlatescu, Antigaz (Bucharest) 9, pp. 12–21. In the latter method the reaction was also carried out in a gaseous phase by the use of a catalyst, such as activated carbon, or by the presence of a small amount of thiodiglycol present as a solvent for the gases.

We have found that it is possible to accomplish the manufacture of thiodiglycol by a single chemical reaction or condensation of the two gases in the proportion of two volumes of ethylene oxide to one volume of hydrogen sulfide rather than in the two or three stage reaction indicated by Nenitzescu and at tremendously greater productive capacities of equipment used. Furthermore, we have found it possible and highly desirable to accomplish this reaction in the liquid phase rather than in the gaseous phase as accomplished by the previously mentioned investigators. We prefer in the carrying out of our invention to utilize as the liquid phase in which the reaction is conducted the thiodiglycol itself as the product, or the ethylene oxide itself as one of the reactants; although we have also found that other liquids, such as aniline or kerosene in which one or the other of the reacting gases is soluble, may also be used as a suitable liquid phase for the reaction. The use of a liquid which is neither product nor reactant usually requires the subsequent step of separation of the solvent liquid from the product liquid. Normally this is a disadvantage although in many cases where there is a further chemical or physical step involving the product the pressure of this added solvent may be an advantage.

In the previous reaction of ethylene oxide and hydrogen sulfide as conducted by Chichibabin, it was found desirable to add more water than hydrogen sulfide in order to accomplish this chemical combination and then to allow the reaction to go forward over a period of some 15 hours and in different steps at various temperatures. We have found that if the ethylene oxide is maintained in the liquid phase and the hydrogen sulfide added under a total pressure up to 300 pounds per square inch and a temperature of from 65–212° F., that the reaction may be accomplished within a period of time as small as a fraction of a second and, at the most, not over an hour. To do this it is, however, desirable to have a pressure vessel of a size not more than twice the volume of the amount of ethylene oxide added and to add the hydrogen sulfide by suitable bubbling through the liquid or other vapor liquid contact such as agitation by sprays, packing, or otherwise so that the hydrogen sulfide may dissolve in the liquid ethylene oxide itself and not merely exist in the gas phase above the liquid. We have found from our experiments that the increase of the pressure from atmospheric pressure to 300 pounds per square inch will increase the speed of reaction many thousandfold, while even a moderate pressure of 60 pounds per square inch stimulates the reaction by about 50 times. The increase of the temperature from room temperature to 212° F. will also increase the reaction by about 25–30 times, while we find that at 140° F. the speed is almost 5 times as great as at 65° F. We have found that we may simultaneously get the effect of increased temperature and increased pressure resulting almost as the product of the factors mentioned above; and in general, we have to remove heat by cooling rather than adding heat as did Chichibabin. We have found, however, that because of the greater speed of the reaction when operated at this high pressure, we may actually operate at a higher temperature than would otherwise be possible without the serious decomposition of the thiodiglycol as shown by a coloration thereof when it is produced slowly at temperatures of 140–212° F. In our operation we minimize the decomposition because of the very small amount of time required due to our tremendously greater speed in comparison with the approximately 15 hours hitherto thought necessary by Chichibabin.

We have found that it is possible to obtain yields of thiodiglycol in excess of 99% when starting with the pure gases hydrogen sulfide and ethylene oxide and without any catalyst whatsoever when we accomplish the reaction in the liquid phase of ethylene oxide, or thiodiglycol, or a mixture thereof and under conditions of superatmospheric pressure. We have found if we start with ethylene oxide as the solvent liquid and add the hydrogen sulfide thereto under pressure that the reaction proceeds almost as fast as the hydrogen sulfide can be added and more and more of the ethylene oxide itself is converted to thiodiglycol, giving a mixture of the two liquids in which the reaction continues to take place. The continued addition of hydrogen sulfide uses up the ethylene oxide so that the liquid becomes purer and purer thiodiglycol until all of the ethylene oxide is combined and there results substantially pure thiodiglycol. Continued addition of hydrogen sulfide will, of course, be possible up to the solubility limit of hydrogen sulfide in thiodiglycol. As it is not always possible to exactly measure the amount of hydrogen sulfide to be added, there may occasionally be some excess added; and it (also gaseous impurities or excess ethylene oxide in case insufficient hydrogen sulfide is added) may be removed either by heating, by the application of vacuum, or both.

In the event that thiodiglycol itself is to be used as the solvent material for the liquid phase of the reaction, we have found it has a considerable solubility, both for ethylene oxide and for hydrogen sulfide, and that the reaction takes place in this liquid phase between the two gases dissolved therein and without the presence of any catalyst. Thus it is possible to manufacture thiodiglycol by supplying, preferably under pressure as explained above, ethylene oxide as the gas or liquid and hydrogen sulfide to the liquid phase of thiodiglycol. We have found that the addition of the hydrogen sulfide and the ethylene oxide to the liquid phase may be continuously performed and a part of the thiodiglycol continuously removed in equivalent amount to that which is removed by the chemical reaction. This is the case only in the event that pure gases are available for this manufacturing operation. In the event that commercially pure gases are available, which in general may contain traces of non-reactive gases such as air, it is, of course, obvious that provision must be made in the reaction vessel, of whatever nature it may be, for the removal of the extraneous gases which are present as impurities.

Another method of accomplishing the reaction is to utilize an ordinary tower of the gas absorption type of suitable material of construction and designed to withstand whatever pressure, either sub-atmospheric or super-atmospheric, under which the operation may be conducted. In this case, the column is charged at the start with a suitable amount of thiodiglycol; and a pump is connected so as to circulate the thiodiglycol from the base of the column to the top of the column, thus allowing it to descend over the packing or other filling material or arrangements for countercurrent contact with gases rising in the column. The two gases are added at the base in the proportion of two parts of ethylene oxide to one of hydrogen sulfide and in rising through the column are dissolved by the thiodiglycol which is descending. The thiodiglycol running down the column discharges at the base to a reservoir of suitable capacity. In this reservoir of liquid, as, of course, in the liquid which is in the column, the reaction itself proceeds. Ordinarily, we prefer to run the process continuously, and therefore the reservoir may be provided with a series of baffles which will retard the flow of liquid in which the action is proceeding, during its course through the reservoir, sufficiently so that the reaction is completed at the bottom of the reservoir. A portion of the pure thiodiglycol from this reservoir is recirculated for continued gas absorption. A suitable amount of thiodiglycol is withdrawn from the reservoir by an overflow or other device as fast as its production is accomplished. Impurities such as air in the original gases which are soluble in thiodiglycol but which are non-reactive serve merely to build up within their solubility limits in the liquid phase; and the balance is discharged with non-soluble impurities from the top of the column. We have found that the reaction of the two gases in the liquid phase gives off heat and this serves to heat the system. In general, we prefer to operate at a temperature not higher than the range of 140–212° F. and, therefore, we have found that it is occasionally necessary to intersperse a cooling unit in the circuit of the thiodiglycol from the reservoir to the top of the absorption column.

Nenitzescu and Scarlatescu indicated that the thiodiglycol seems to play the part of a solvent for both the gases and thus to hasten the reaction and indicated a method of accomplishing the reaction in an open tower which was charged initially with thiodiglycol by pouring an amount over the packing beads before the gases were added. We have found that in our operation of the reaction tower at atmospheric pressure we may gain a capacity of from 5 to 10 times as great as in the system of Nenitzescu and Scarlatescu. The reason for this is that in an open system initially charged, the reaction cannot take place until absorption of the gas in the liquid phase is accomplished and then when this absorption is accomplished further absorption cannot be accomplished until after the reaction of the gases which are dissolved in this liquid phase. We have measured the relative rates of the reaction itself and of the absorption of the gases in the liquid and have found that the reaction rate is only about ⅕ as fast as the absorption rate and that the reaction is thus the limiting factor in the combined process. By the circulation of the solvent-product over and through an efficient absorption column, the gases may be absorbed many times faster than the reaction may use them up and thus if the liquid saturated with the gases is stored at the base of the column, the reaction of the gases may go to completion. The above mentioned ratio of ⅕ was, however, obtained in a static column such as that of Nenitzescu; while in the column of our preference with a washing liquid down, the rate of gas absorption is even much greater because of this efficient scrubbing action as compared to the static condition wherein a small film is on the packing. We have found that in practice the capacity of the column is as much as 10 or more times that would be predicted from the ratio of the rate of absorption to the rate of reaction. It is, of course, necessary in this system to have the storage reservoir at the base of the column ample in size to allow time for the reaction of the dissolved gases in the liquid before withdrawal, while in the vessel used by Nenitzescu such capacity was not necessary due to the fact that his reaction took place in the absorption column proper and in the liquid film at the surface of the packing material which would drain under those conditions very, very slowly. It is, of course, very much cheaper to build a tank to accommodate the liquid wherein the reaction proceeds once absorption has taken place (particularly if pressure is used as hereinafter mentioned) rather than to depend on storing the liquid in which the reaction is slowly proceeding on the surface of the packing in an absorption column and making this column so much larger.

Furthermore, we have found that a tremendous and unexpected increase of capacity is obtained by the use of a closed system of column, reservoir, accessories, etc., in which pressure may be developed rather than with the open system previously utilized. We have found that the absorption itself is accelerated almost in proportion to the absolute pressure, thus at sixty pounds pressure (approximately seventy-five pounds absolute) the capacity of the absorbing column is almost five times what it is at normal atmospheric pressure.

Thus we have shown that there is an advantage of increased capacity for a given column (or decreased size of column for a given unit rate of production) of at least ten times by the use of our preferred method at atmospheric pressure as compared to the previous method while we have also shown that by closing the column (providing a vent for gaseous impurities) and operating under a pressure of say 60 pounds per square inch we get a still further increase of some five times. These improvements are factors and our net result is an increase in capacity (or decrease of necessary column size) of at least 50 times. Further increases of pressure greatly increase even this tremendous improvement.

The chemical reaction following the gas absorption also goes some 50 times faster at a pressure of 60 pounds (many thousand times as fast at 300 pounds) as previously mentioned for the batch method of manufacture. Also, as previously shown, the reaction is stimulated by temperature to the extent of five times at 140° F. and 25–30 times at 212° F. as at room temperature and thus at 60 pounds pressure and 140° F. the chemical reaction is 50 times 5 or 250 times as fast as at room temperature and pressure. Temperatures as high as 300° F. or higher may be used although minor decomposition of the product takes place. This means that a comparatively smaller reservoir is required if the operation is conducted under pressure or temperature, or both; and a considerable gain is thus realized in the economy of constructing suitable apparatus to manufacture a given amount. The cost of the absorption column per unit of volume is much more considerable and the advantage gained by the increase of pressure is more important in considering the cost of manufacturing equipment.

Thus we have found that the absorption in a pressure system operated under pressure and by the above method results in an increase in amount of production of thiodiglycol, by as much as 100 to 200 or even more times that possible when operated according to the method of Nenitzescu and this has been explained by the fact that the result of the faster absorption rate and the higher pressure is the product of the factors above mentioned for the increase of capacity due to either the better absorption or the higher pressure. Furthermore, due to the rapidity with which the reaction may be made to take place under these conditions, it is possible to somewhat increase the limit temperature mentioned by Nenitzescu as the limiting temperature before decomposition is obtained and improve even these figures.

It is obvious that in the countercurrent operation of a combined tower and reservoir with accessories for this two stage manufacture wherein the absorption is substantially accomplished in the tower and the reaction in the pot, the design of the tower will be simply that of any tower used for gas absorption alone. The height will be merely that required to entirely absorb the gases introduced at the base so that no absorbable ethylene oxide or hydrogen sulfide may reach the top of the column. The efficiency of absorption thus determines the height, and the cross-section of the column is, of course, determined by the desired capacity, although these two dimensions are somewhat interrelated, as is familiar to those skilled in the art of gas absorption. The design of the pot depends merely on the amount of time required for the reaction to take place and the liquid removed from the pot should have very little, if any, gas dissolved therein unreacted so that it may have the maximum efficiency in the absorption column proper in absorbing the two gases rising therein. Suitable baffles or other devices so fixed that the gas saturated liquid from the tower has to traverse substantial distances in the reaction pot may be used to allow complete reaction in the liquid before it is removed for recirculation or product. The amount of liquid thus circulated to the top of the column must, of course, be ample to accomplish the absorption operation; and it is obvious that in the event the reaction pot is not large enough to allow sufficient time for the complete reaction of the gases before the liquid passes out and to the column, that to some extent this may be corrected by an increased circulation. We have also found that in some cases it is desirable to put a cooling coil in the pot proper as well as the heat interchanger above mentioned. Furthermore, the pot itself may be dispensed with, but with a reduced capacity or efficiency or both.

If desired, the gas absorption tower method for continuous production may be operated by using liquid ethylene oxide as an absorbing liquid, and hydrogen sulphide as the counterflowing gas under pressure conditions at least sufficient to maintain the ethylene oxide as a liquid. Either added pressure or temperature, or both, serves to accelerate the process in proportions equivalent to those given in respect to the examples where thiodiglycol was used as a gas absorptive medium. It is obvious that any absorptive medium which is used should readily dissolve the hydrogen sulphide and ethylene oxide gases and be non-reactive to the gases or to the thiodiglycol.

Various modifications and combinations of various features of the present invention as heretofore set out in the illustrative examples will now occur to those skilled in the art, and certain procedures described may be re-placed by other procedures, and certain features used without other features without departing from the spirit of the invention. Reference is therefore to be had to the appended claims for definition of said invention.

We claim:

1. The method of manufacturing thiodiglycol which includes the steps of introducing gaseous ethylene oxide and hydrogen sulphide into a solvent liquid in a countercurrent gas absorption tower under conditions of super-atmospheric pressure, and wherein the solvent liquid is introduced at an upper level of the tower and the gases at a level therebelow, and wherein solution of thiodiglycol in the solvent is withdrawn at a level below the feed level of the solvent.

2. The method of manufacturing thiodiglycol which includes the steps of introducing gaseous ethylene oxide and hydrogen sulphide into a solvent liquid in a countercurrent gas absorption tower and then completing the reaction of the dissolved gases in a reaction reservoir connected with said tower, and wherein the solvent liquid is introduced at an upper level of the tower and the gases at a level therebelow, and wherein solution of thiodiglycol in the solvent is withdrawn at a level below the feed level of the solvent.

3. The method of manufacturing thiodiglycol which includes the steps of introducing gaseous ethylene oxide and hydrogen sulphide under heat and super-atmospheric pressure conditions into a solvent liquid in a countercurrent gas absorption tower and then completing the reaction of the dissolved gases in a reaction reservoir connected with said tower, and wherein the solvent liquid is introduced at an upper level of the tower and the gases at a level therebelow, and wherein solution of thiodiglycol in the solvent is withdrawn at a level below the feed level of the solvent.

4. The method of manufacturing thiodiglycol which includes the steps of dissolving gaseous ethylene oxide and hydrogen sulphide into liquid thiodiglycol in a countercurrent gas absorption tower and then completing the reaction of the dissolved gases in a reaction reservoir connected with said tower, and wherein the liquid thiodiglycol is introduced at an upper level of the tower and the gases at a level therebelow, and wherein thiodiglycol is withdrawn at a level below the feed level of the liquid thiodiglycol.

5. The method of manufacturing thiodiglycol which includes the steps of dissolving gaseous ethylene oxide and hydrogen sulphide into liquid thiodiglycol at a temperature in excess of 65° F. in a countercurrent gas absorption tower and then completing the reaction of the dissolved gases in a reaction reservoir connected with said tower, and wherein the liquid thiodiglycol is introduced at an upper level of the tower and the gases at a level therebelow, and wherein thiodiglycol is withdrawn at a level below the feed level of the liquid thiodiglycol.

6. The method of manufacturing thiodiglycol which includes the steps of dissolving gaseous ethylene oxide and hydrogen sulphide into liquid thiodiglycol at super-atmospheric pressure in a countercurrent gas absorption tower and then completing the reaction of the dissolved gases in a reaction reservoir connected with said tower, and wherein the liquid thiodiglycol is introduced at an upper level of the tower and the gases at a level therebelow, and wherein thiodiglycol is withdrawn at a level below the feed level of the liquid thiodiglycol.

7. The method of manufacturing thiodiglycol which includes the steps of dissolving gaseous ethylene oxide and hydrogen sulphide under heat and super-atmospheric pressure conditions into liquid thiodiglycol in a countercurrent gas absorption tower and then completing the reaction of the dissolved gases in a reaction reservoir connected with said tower, and wherein the liquid thiodiglycol is introduced at an upper level of the tower and the gases at a level therebelow, and wherein thiodiglycol is withdrawn at a level below the feed level of the liquid thiodiglycol.

8. The method of continuously manufacturing thiodiglycol which includes the steps of dissolving gaseous ethylene oxide and hydrogen sulphide into liquid thiodiglycol in a countercurrent gas absorption tower and then completing the reaction of the dissolved gases in a reaction reservoir connected with said tower, and continuously utilizing a portion of the thiodiglycol in the reaction reservoir by circulating the same to the absorption tower for use as a solvent liquid, and wherein the liquid thiodiglycol is introduced at an upper level of the tower and the gases at a level therebelow, and wherein thiodiglycol is withdrawn at a level below the feed level of the liquid thiodiglycol.

9. The method of continuously manufacturing thiodiglycol which includes the steps of dissolving gaseous ethylene oxide and hydrogen sulphide under heat and superatmospheric pressure conditions into liquid thiodiglycol in a countercurrent gas absorption tower and then completing the reaction of the dissolved gases in a reaction reservoir connected with said tower, and continuously utilizing a portion of the thiodiglycol in the reaction reservoir by circulating the same to the absorption tower for use as a solvent liquid, and wherein the liquid thiodiglycol is introduced at an upper level of the tower and the gases at a level therebelow, and wherein thiodiglycol is withdrawn at a level below the feed level of the liquid thiodiglycol.

10. The continuous method of manufacturing thiodiglycol which includes dissolving hydrogen sulphide into liquid ethylene oxide in a countercurrent gas absorption tower under pressure conditions, and wherein the liquid ethylene oxide containing dissolved thiodiglycol is introduced at an upper level of the tower and the gases at a level therebelow and wherein thiodiglycol is withdrawn at a level below the feed level of the liquid ethylene oxide containing dissolved thiodiglycol.

11. The continuous method of manufacturing thiodiglycol which includes dissolving hydrogen sulphide into liquid ethylene oxide in a counter-current gas absorption tower under pressure and heat conditions and completing the reaction in a reaction vessel connected with the tower, and wherein the liquid ethylene oxide containing dissolved thiodiglycol is introduced at an upper level of the tower and the gases at a level therebelow, and wherein thiodiglycol is withdrawn at a level below the feed level of the liquid ethylene oxide containing dissolved thiodiglycol.

12. The method defined in claim 8 wherein the gases are dissolved at temperatures in excess of 65° F.

13. The method defined in claim 8 in which the gases are dissolved at super-atmospheric pressures.

14. The method defined in claim 11 wherein the temperature is in excess of 65° F. and the pressure is in excess of 60 lbs. per square inch.

15. The method defined in claim 11 wherein the temperature is between 65-212° F. and the pressure is between 60-300 lbs. per square inch.

16. The method of manufacturing thiodiglycol under anhydrous conditions which includes dissolving hydrogen sulphide into liquid ethylene oxide in a pressure vessel under conditions of heat and relatively substantial pressure.

17. The method of manufacturing thiodiglycol under anhydrous conditions which includes dissolving hydrogen sulphide into liquid ethylene oxide in a pressure vessel under a pressure in excess of 60 lbs. per square inch and at a temperature in excess of 65° F.

18. The method of manufacturing thiodiglycol under anhydrous conditions which includes dissolving hydrogen sulphide into liquid ethylene oxide in a pressure vessel under a pressure of 60-300 lbs. per square inch and at a temperature of between 65-212° F.

19. The method of manufacturing thiodiglycol under substantially anhydrous conditions which includes the steps of introducing gaseous ethylene oxide and hydrogen sulphide into a solvent liquid in a counter-current gas absorption tower under conditions of super-atmospheric pressure, and wherein the solvent liquid is introduced at an upper level of the tower and the gases at a level therebelow, and wherein solution of thiodiglycol in the solvent is withdrawn at a level below the feed level of the solvent.

20. The method of manufacturing thiodiglycol under substantially anhydrous conditions which includes the steps of introducing gaseous ethylene oxide and hydrogen sulphide into a solvent liquid in a counter-current gas absorption tower and then completing the reaction of the dissolved gases in a reaction reservoir connected with said tower, and wherein the solvent liquid is introduced at an upper level of the tower and the gases at a level therebelow, and wherein solution of thiodiglycol in the solvent is withdrawn at a level below the feed level of the solvent.

21. The method of continuously manufacturing thiodiglycol under substantially anhydrous conditions which includes the steps of dissolving gaseous ethylene oxide and hydrogen sulphide under heat and super-atmospheric pressure conditions into liquid thiodiglycol in a counter-current gas absorption tower and then completing the reaction of the disssolved gases in a reaction reservoir connected with said tower, and continuously utilizing a portion of the thiodiglycol in the reaction reservoir by circulating the same to the absorption tower for use as a solvent liquid, and wherein the liquid thiodiglycol is introduced at an upper level of the tower and the gases at a level therebelow, and wherein thiodiglycol is withdrawn at a level below the feed level of the liquid thiodiglycol.

22. The method of manufacturing thiodiglycol under substantially anhydrous conditions which includes dissolving hydrogen sulphide into liquid ethylene oxide in a pressure vessel under conditions of heat and pressure.

DONALD F. OTHMER.
DONALD Q. KERN.